(No Model.)

3 Sheets—Sheet 1.

N. P. NEAL.
LIFE INSURANCE TABLE OR CHART.

No. 602,035.

Patented Apr. 5, 1898.

*Fig. 1.*

(No Model.)

3 Sheets—Sheet 2.

N. P. NEAL.

LIFE INSURANCE TABLE OR CHART.

No. 602,035. Patented Apr. 5, 1898.

Fig. 1ª

| 73 | 74 | 75 | 76 | 77 | 78 | 79 |
|---|---|---|---|---|---|---|
| 5332 | 4817 | 4,292 | 3,789 | 3,308 | 2,839 | 2,462 |
| | | 2841 | | | | |
| | | | | | | 1177 |
| | | | | | 1264 | 364 |
| | | | | 1332 | 1020 | 732 |
| | | | 1390 | 1069 | 769 | 492 |
| | | 1437 | 1111 | 803 | 514 | 248 |
| | 1472 | 1143 | 829 | 534 | 356 | 1942 |
| 1497 | 1169 | 853 | 551 | 367 | 2208 | 4238 |
| 1183 | 867 | 563 | 373 | 2486 | 4793 | 6927 |
| 875 | 571 | 373 | 3952 | 5367 | 7790 | 10,064 |
| 573 | 281 | 3060 | 9578 | 8676 | 11,231 | 13622 |
| 281 | 3362 | 6546 | 13678 | 12447 | 15,153 | |
| 3644 | 7142 | 10488 | 18280 | 16711 | | |
| 7,786 | 11,397 | 14913 | | | | |
| 12,302 | 11,146 | 19852 | | | | |
| 17,365 | 21,412 | | | | | 39,680 |
| 22950 | | | | | 43,152 | |
| | | | | 46,541 | | |
| | | 53192 | 49895 | | | |
| | 56824 | | | | | 82337 |
| 59536 | | | | | 87787 | |
| | | | | 93,034 | | |
| | | | 98191 | | | |
| | | 103177 | | | | |
| 100,284 | 107,875 | | | | | 144,569 |
| 112,664 | | | | | 152,603 | |
| | | | | 159,628 | | |
| | | | 166,465 | | | |
| | | 173036 | | | | |
| | 178892 | | | | | 230,721 |
| 185,501 | | | | | | |
| | | 272429 | | | | 345,985 |
| | | 394751 | | | | 495,218 |
| | | 555110 | | | | 690,856 |
| | | 758119 | | | | 938,527 |
| | | 1014353 | | | | 1,251,133 |
| 1,281,774 | 1,340,015 | 1,396,676 | 1,455,313 | 1,516,011 | 1,578,859 | 1,648,440 |
| 73 | 74 | 75 | 76 | 77 | 78 | 79 |

WITNESSES:
M. D. Blondel
Amos W. Hart

INVENTOR
Nathan P. Neal.
BY Munn & Co.
ATTORNEYS.

(No Model.)      3 Sheets—Sheet 3.

N. P. NEAL.
LIFE INSURANCE TABLE OR CHART.

No. 602,035.      Patented Apr. 5, 1898.

Fig. 1b

| 80 | 81 | 82 | 83 | 84 | 85 | 86 | 87 | 88 | 89 | 90 | AGES | MEMBERS LIVING OR PREMIUMS PAID |
|---|---|---|---|---|---|---|---|---|---|---|---|---|
| | | | | 908 | 698 | 522 | 381 | 255 | 168 | 94 | 91 | |
| | | | | 782 | 580 | 410 | 276 | 154 | 55 | 99 | 90 | 95 |
| | | | | 689 | 495 | 332 | 195 | 355 | 166 | 272 | 89 | 160 |
| | | | 784 | 581 | 394 | 237 | 188 | 255 | 481 | 540 | 88 | 245 |
| | | 889 | 652 | 457 | 277 | 126 | 365 | 635 | 826 | 958 | 87 | 351 |
| | 992 | 734 | 506 | 318 | 145 | 496 | 881 | 1171 | 1382 | 1439 | 86 | 477 |
| 1088 | 814 | 566 | 347 | 188 | 647 | 1169 | 1581 | 1899 | 2141 | 2326 | 85 | 622 |
| 886 | 623 | 385 | 174 | 820 | 1500 | 2056 | 2508 | 2858 | | 3359 | 84 | 738 |
| 685 | 432 | 208 | 1000 | 1860 | 2581 | 3180 | 3672 | | | 4766 | 83 | 962 |
| 463 | 220 | 1212 | 2260 | 3170 | 3944 | 4598 | | | | 6333 | 82 | 1165 |
| 234 | 1440 | 2710 | 3818 | 4791 | 5630 | | | | | 8808 | 81 | 1385 |
| 1684 | 3191 | 4531 | 5712 | 6760 | | | | | 10368 | 10877 | 80 | 1619 |
| 3704 | 5292 | 6716 | 7985 | | | | | | | 13867 | 79 | 1867 |
| 6092 | 7776 | 9299 | | | | | | | | 17507 | 78 | 2123 |
| 8888 | 10684 | | | | | | | | | 21540 | 77 | 2390 |
| 12151 | | | | | | | | | | 26291 | 76 | 2663 |
| | | | | 23338 | | | | | 30040 | 31855 | 75 | 2942 |
| | | | | | | | | | | 38112 | 74 | 3223 |
| | | | | | | | | | | 45357 | 73 | 3504 |
| | | | | | | | | | | 58201 | 72 | 3784 |
| | | | | | | | | | | 62044 | 71 | 4059 |
| | | | | 55040 | | | | | 63290 | 71960 | 70 | 4328 |
| | | | | | | | | | | 82910 | 69 | 4589 |
| | | | | | | | | | | 95075 | 68 | 4841 |
| | | | | | | | | | | 107958 | 67 | 5085 |
| | | | | | | | | | | 122334 | 66 | 5316 |
| | | | | 106688 | | | | | 132230 | 137691 | 65 | 5538 |
| | | | 115085 | | | | | | | 154414 | 64 | 5750 |
| | | 122800 | | | | | | | | 172562 | 63 | 5952 |
| | 130477 | | | | | | | | | 191607 | 62 | 6164 |
| 138027 | | | | | | | | | | 212118 | 61 | 6327 |
| | | | | 183134 | | | | | | 233991 | 60 | 6501 |
| | | | | | | | | | | 248875 | 59 | 6669 |
| | | | | | | | | | | 273071 | 58 | 6826 |
| | | | | | | | | | | 298981 | 57 | 6975 |
| | | | | | | | | | | 325989 | 56 | 7117 |
| | | | | 288240 | | | | | | 366950 | 55 | 7252 |
| | | | | | | | | | | 399839 | 54 | 7380 |
| | | | | | | | | | | 433054 | 53 | 7502 |
| | | | | | | | | | | 468215 | 52 | 7619 |
| | | | | | | | | | | 505283 | 51 | 7713 |
| | | | | 428862 | | | | | | 544836 | 50 | 7839 |
| | | | | | | | | | | 586332 | 49 | 7943 |
| | | | | | | | | | | 629139 | 48 | 8044 |
| | | | | | | | | | | 673911 | 47 | 8142 |
| | | | | | | | | | | 724218 | 46 | 6237 |
| | | | | 610926 | | | | | | 775149 | 45 | 8330 |
| | | | | | | | | | | 829344 | 44 | 8421 |
| | | | | | | | | | | 883870 | 43 | 8510 |
| | | | | | | | | | | 943946 | 42 | 8598 |
| | | | | | | | | | | 1005430 | 41 | 8687 |
| | | | | 849604 | | | | | | 1077075 | 40 | 8771 |
| | | | | | | | | | | 1139424 | 39 | 8856 |
| | | | | | | | | | | 1209980 | 38 | 8940 |
| | | | | | | | | | | 1286874 | 37 | 9023 |
| | | | | | | | | | | 1365413 | 36 | 9106 |
| | | | | 1151763 | | | | | | 1459306 | 35 | 9188 |
| | | | | | | | | | | 1536094 | 34 | 9270 |
| | | | | | | | | | | 1627996 | 33 | 9352 |
| | | | | | | | | | | 1720140 | 32 | 9433 |
| | | | | | | | | | | 1825119 | 31 | 9514 |
| | | | | 1533142 | | | | | | 1941751 | 30 | 9595 |
| | | | | | | | | | | 2040231 | 29 | 9676 |
| | | | | | | | | | | 2156658 | 28 | 9757 |
| | | | | | | | | | | 2274745 | 27 | 9838 |
| | | | | | | | | | | 2404466 | 26 | 9919 |
| 1648440 | 1716061 | 1786743 | 1934753 | 2017857 | 2099213 | 2183683 | 2271395 | 2362508 | 2450208 | 2554915 | 25 | 10000 |
| 80 | 81 | 82 | 83 | 84 | 85 | 86 | 87 | 88 | 89 | 90 | AGES | |

WITNESSES:      INVENTOR
M. D. Blondel      Nathan P. Neal.
Amos W. Hart      BY Munn & Co.
     ATTORNEYS.

UNITED STATES PATENT OFFICE.

NATHAN P. NEAL, OF WAXAHACHIE, TEXAS.

LIFE-INSURANCE TABLE OR CHART.

SPECIFICATION forming part of Letters Patent No. 602,035, dated April 5, 1898.

Application filed October 7, 1897. Serial No. 654,413. (No model.)

*To all whom it may concern:*

Be it known that I, NATHAN PERRY NEAL, of Waxahachie, in the county of Ellis and State of Texas, have invented a new and useful Life-Insurance Table or Chart, of which the following is a specification.

It is the object of my invention to represent and illustrate certain principles of life-insurance and the practical application of the same lineally, geometrically, and mathematically. The table shows those living and paying premiums each year or any series of years and also those who die each year or any series of years and enables one to better understand the mathematical results. It illustrates by scale, lineally and proportionally, year by year the number of persons insured and also the number of deaths.

The *American Experience Table of Mortality* limits life to ninety-six (96) years; but I prefer to assume ninety-one (91) years as the limit, at the expiration of which period all insured persons are assumed to be deceased and their policies paid and canceled the same as if they were actually deceased; but the table or chart is in other respects based on the *American Experience Table of Mortality*, and interest is reckoned at four (.04) per cent. It is to be understood, however, that the principle of my table or chart is applicable to any other table of mortality and any other rate of interest. My table is also based upon the number of ten thousand persons, all of whom are assumed to be insured at the age of twenty-five and all deceased at the age of ninety-one.

In the accompanying drawings, in which, since a complete illustration of the chart is unnecessary, I show only the end and central portions of the same—that is to say, Figure 1 is a plan view of the left-hand portion of the chart. Fig. 1ᵃ is a plan view of the middle portion of the chart, and Fig. 1ᵇ is a plan view of the right-hand portion of the chart.

The table is formed geometrically by dividing it vertically and horizontally by means of straight parallel lines, which, crossing each other at right angles, form rectangular parallelograms whose length varies—*i. e.*, they correspond to a particular year and the assumed mortality of that age in the life of the insured. The width of the parallelograms is, however, invariable, being equal to one-fifth of an inch, while the length of a horizontal row of parallelograms is fifty inches. Thus each row contains ten square inches, so that one thousand premiums are taken for each square inch of surface, thus representing geometrically the premiums paid any year or series of years. The length of a horizontal row being fifty inches and the number insured being ten thousand, each inch or row represents lineally two hundred living persons or premiums. Premiums and death claims are to be paid for sixty-six years, or from the age of twenty-five to the age of ninety-one, and the table is so divided that there are sixty-seven parallelograms in every vertical row and sixty-six in every horizontal row, so that all ages from twenty-five to ninety-one are represented both ways across the table. There are therefore four thousand four hundred and twenty-two time-squares or parallelograms.

All the ten thousand insured persons being alive at twenty-five years of age they all pay premiums for that year, and the number "25" is placed at the left and right opposite the lower horizontal row of parallelograms. Thus numbers from "25" to "91" are placed at the left and right of the table opposite the horizontal rows, the numbers being thus arranged progressively in a vertical column, which is denominated the "age-column." The same numbers "25" to "90" are also inscribed in the proper spaces at top and bottom of the table.

The table shows that eighty-one out of the ten thousand persons die the first year, or at the age of twenty-five.

In the first parallelogram at the left of the second row from the bottom of the table and contiguous to the age-number "26" appears the number "81," which indicates the number of persons out of the ten thousand who will die the first year, and this number ("81") appears in the parallelogram directly above and adjoining the one containing the ten thousand four hundred premiums paid for that year, together with accrued interest for that year. The number who die the next year is also eighty-one, and that number is placed diagonally to the right in the next—*i. e.*, the third—horizontal row of parallelograms from the bottom of the table, and therefore opposite, but two removes from, the number "27" in the age-column A. The number of deaths remains eighty-one for the next six years, from twenty-eight to thirty-two, inclusive, and is eighty-two for the thirty-fourth and thirty-fifth years, eighty-three for the thirty-sixth and thirty-seventh years, eighty-four for the thirty-eighth year, and eighty-five for the thirty-ninth year, and so on. These and other numbers indicating the death rate are arranged in parallelograms that touch each other and extend in a curved line from the number "25" at lower left-hand corner of the table to the number "91" at upper right-hand corner, and this diagonal line divides the table of four thousand four hundred and twenty-two parallelograms into two approximately equal parts—*i. e.*, into two nearly equal right-angled triangles—of which said line is the common hypotenuse. The terms "diagonal" and "hypotenuse" are here used for convenience of description as expressing the essential fact, although not with technical accuracy. The several parallelograms of said line are shaded to indicate their location more distinctly. These parallelograms containing numbers indicating deaths at successive regular periods may therefore be termed the "mortuary-line" from age twenty-five to ninety, inclusive. It separates the living or premium-paying persons from the death claims, those to be paid being above said line and those living or paying premiums below said line. The deaths in each year are indicated in such mortuary-line immediately above and adjoining the parallelogram containing the number indicating the premium paid for the year it accrued and interest. The premiums for any year or term of years are shown on the parallelograms in horizontal row corresponding to age when premiums commenced and at its intersection with vertical column at age when last premium was paid, and the claims of any year or term of years are shown on the parallelograms in the vertical row or column corresponding to the age when premiums began and at its intersection with the horizontal column corresponding with age attained at end of the term.

For example, take age twenty-five, term one year. The premium is $\frac{81,000}{10,400}$. For term two years the premium is $\frac{165,000}{21,132}$. For term three years premium is $\frac{253,000}{32,209}$; four years, $\frac{344,000}{43,644}$; five years, $\frac{439,000}{55,453}$; ten years, $\frac{976,000}{120,638}$; for life or to age ninety-one, $\frac{36,548,000}{2,554,915}$. These are the net premiums for the several ages and terms according to the *American Experience Table of Mortality* and .04 interest; but the principle is applicable to any mortuary-table or any rate of interest or to any table or chart showing lapses and their effect.

Since the diagonal mortuary-line divides the table so that one half the four thousand four hundred and twenty-two time-spaces or parallelograms are found on the premium or living side the remaining one half are on the death side. It will be seen, further, that the apex of the lower right-angled triangle at the left of the table is formed by the intersection of the diagonal line of the table and that this intersection is in the column of ages at twenty-five and is the common apex of sixty-six (66) right-angled triangles corresponding to each age attained in reaching age ninety-one. Each of these sixty-six (66) right-angled triangles has the mortuary-line as its hypotenuse, and in the horizontal column of ages corresponding to age twenty-five are to be found consecutively on the chart the premiums and interest corresponding to all ages attained when premiums were paid, as expressed in the vertical column of ages to age ninety-one, thus connecting the premiums of age twenty-five with all ages attained in reaching age ninety-one and thereby determining and properly locating the same on the horizontal column corresponding to age twenty-five—the premiums, with interest, for any and all terms of years or ages reached to age ninety-one.

The length or area of the horizontal column of each triangle measures or determines the death claims or losses for the term or period it embraces, said arm being the horizontal projection of the mortuary-line for the time or period embraced, and similarly it will be seen, further, that the apex of the upper right-angled triangle at the left of the table is formed by the intersection of the diagonal and shaded mortuary-line with the extreme left-hand vertical line of the table and that this intersection is in the vertical column of ages. There are four thousand four hundred and twenty-two rectangles, sixty-six being in each horizontal row and sixty-seven in each vertical row. There are thus two thousand two hundred and eleven rectangles, which form sixty-six right-angled triangles below and sixty-seven above the mortuary-line. The premiums begin on horizontal row 25 and end on horizontal row 90, thus embracing sixty-six years, and in the vertical column of ages corresponding to age twenty-five is to be found consecutively on the chart the death claims and interest corresponding to all ages attained when said claims are due, as expressed in horizontal column of ages attained to age ninety-one, thus connecting the death claims of age twenty-five with all ages attained in reaching age ninety-one, thus determining and properly locating the death claims and interest in vertical column corresponding to age twenty-five for any and all terms of years to age ninety-one.

The elements of claims found in vertical column corresponding to age twenty-five divided by its corresponding element of premiums found in horizontal column corresponding to age twenty-five gives the net premium for the term represented by said claim and premium.

The columns corresponding to age twenty-six embrace sixty-five (65) right-angled triangles on each side of mortuary-line, premiums and interest showing on horizontal line corresponding to age twenty-six and claims in vertical column corresponding to age twenty-six in the manner pointed out above in age twenty-five, and so on for each age, there being one less right-angled triangle on each side of the mortuary-line for each year of advanced age. When age ninety is reached, there is only one on each side of mortuary-line. The premiums of each year pay the claims for that year, and hence they must be so far equal—that is to say, the table represents sixty-six years of corresponding claims or lapses, which equal or balance each other.

What I claim is—

A life-insurance table or chart composed of horizontal and vertical rows of parallelograms, the median and approximately diagonal row of parallelograms containing the number of deaths out of an assumed number of insured persons, annually, for an assumed period, the numbers indicating the years or ages included in such period being inscribed in a vertical column at the side of the table, each number of the series being placed opposite the appropriate horizontal row, and all the parallelograms differing in length according to the mortality of different years or ages, and the parallelograms on the respective sides of the diagonal row or mortuary-line indicating the premiums and the other side the claims, as shown and described.

NATHAN P. NEAL.

Witnesses:
G. P. MIZELL,
F. M. GETZENDANER.